3,277,020
GLASS COMPOSITION AND ELECTRICAL RESIST-
ANCE MATERIAL MADE THEREFROM
Bhogaraju V. Janakirama-Rao, Philadelphia, Pa., assignor
to International Resistance Company, Philadelphia, Pa.
Filed Dec. 19, 1963, Ser. No. 331,768
3 Claims. (Cl. 252—512)

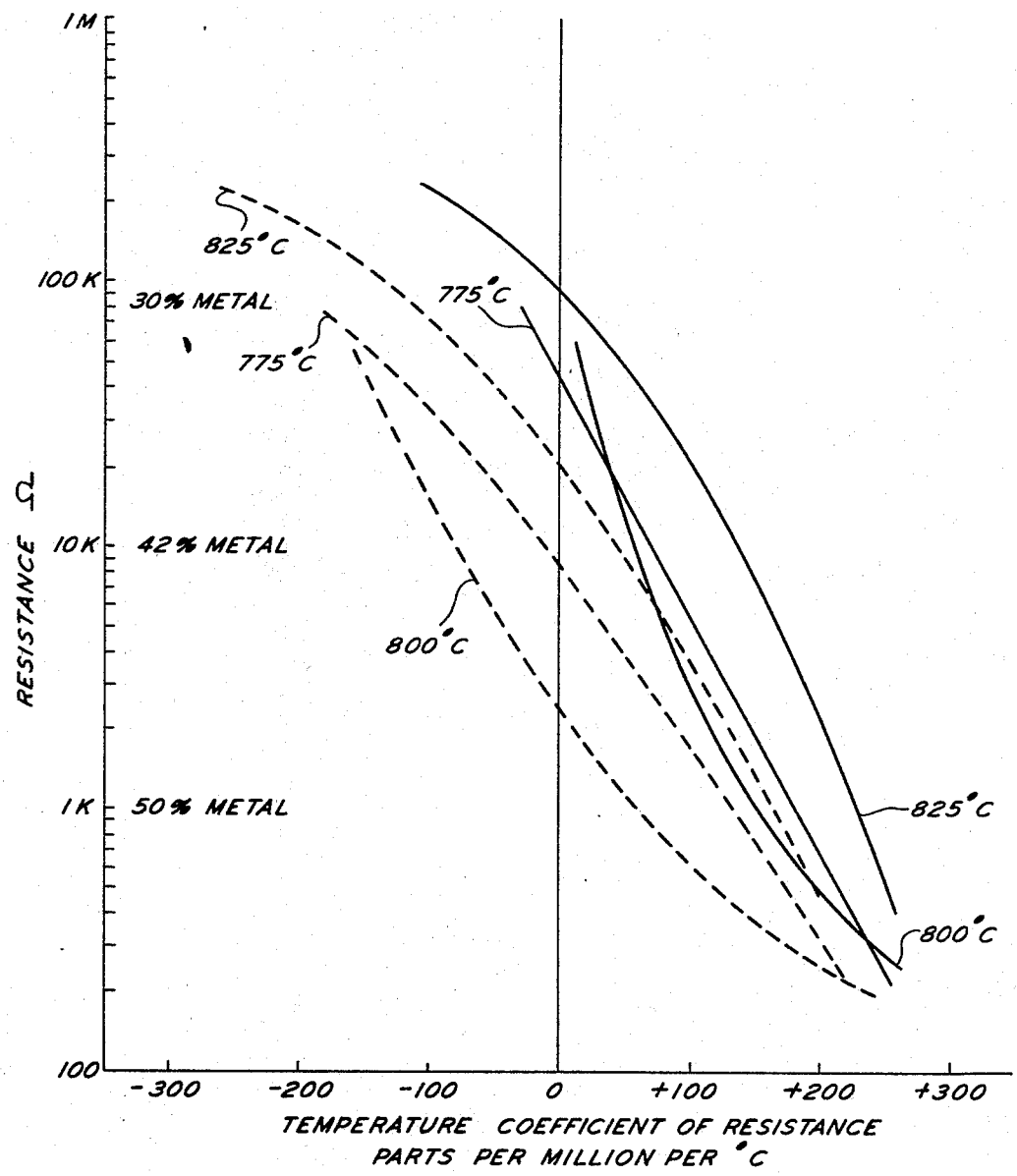

The present invention relates to a glass composition, and more particularly to a glass composition for use in an electrical resistance material.

An electrical resistance material which has recently come into use in the manufacture of electrical resistors is a vitreous enamel resistance material. Such a vitreous enamel resistance material comprises an enamel containing an electrically conductive material. The vitreous enamel resistance material is formed by mixing together a glass frit and finely divided particles of a metal, metal alloy or mixture of metals. The noble metals have been found to be the most satisfactory metals for use as a conductive material in the vitreous enamel resistance materials. To make a resistor, the resistance material is coated on a ceramic dielectric body and fired to fuse and cure the glass frit.

One problem which has arisen with the vitreous enamel resistance materials is with regard to their stability with respect to changes in temperature and to moisture attack. When the resistance material is subjected to a change in temperature, the resistance of the material changes. The amount of change of the resistance per degree change in temperature is known as its temperature coefficient of resistance, hereinafter referred to as T.C. A resistance material having a T.C. of zero is the most stable, and therefore the most satisfactory material. However, resistance material having relatively low T.C.'s, for example less than 300 parts per million per degree C., are very satisfactory for making commercially acceptable resistors.

It is an object of the present invention to provide a novel glass composition.

It is another object of the present invention to provide a glass composition which has a low coefficient of thermal expansion, low softening temperature, and good chemical durability.

It is a further object of the present invention to provide a novel glass composition for use in an electrical resistance material.

It is a still further object of the present invention to provide a novel glass composition for use in an electrical resistance material to lower the temperature coefficient of resistance of the material.

Other objects will appear hereinafter.

The invention accordingly comprises a composition of matter and the product formed therewith possessing the characteristics, properties, and the relation of constituents which will be exemplified in the composition hereinafter described, the scope of the invention will be indicated in the claims.

The drawing is a graph showing the temperature coefficient of resistance and resistance value of resistors made with the glass of the present invention.

Heretofore it was believed that the electrical characteristics of a vitreous enamel resistance material, including the temperature coefficient of resistance, was dependent on the quantity and kind of conductive metal particles used in the material. However, I have discovered that the composition of the glass used in the composition also affects the temperature coefficient of resistance of the material as well as the other electrical characteristics of the material. The glass which has been generally used satisfactorily in vitreous enamel resistance compositions is a barium borosilicate glass. I have discovered that by adding to a barium borosilicate glass titanium oxide ($TiO_2$) and either aluminum oxide ($Al_2O_3$) or calcium oxide (CaO) the coefficient of thermal expansion and the softening temperature of the glass is lower and the chemical durability of the glass is improved. Also, the devitrification tendency of the glass is lowered providing a more stable glass. When the barium borosilicate glass containing the titanium oxide and either aluminum oxide or calcium oxide is used in a vitreous enamel resistance material, these improved properties of the glass result in the resistance material having a substantially lower temperature coefficient of resistance than that of a similar resistance material made with just a barium borosilicate glass, as well as improved stability with regard to moisture.

The glass of the present invention comprises a base glass consisting of by weight 35 to 70% barium oxide (BaO), 0.1 to 60% boron oxide ($B_2O_3$) and 0.1 to 50% silica ($SiO_2$) to which is added 0.1 to 10% titanium oxide ($TiO_2$) and either aluminum oxide ($Al_2O_3$) or calcium oxide (CaO). The titanium oxide and either aluminum oxide or calcium oxide is added to the base glass preferably at the expense of the barium oxide. The preferred composition of the glass of the present invention comprises by weight 52% barium oxide (BaO), 20% boron oxide ($B_2O_3$), 20% silica ($SiO_2$), 4% titanium oxide ($TiO_2$) and 4% of either aluminum oxide ($Al_2O_3$) or calcium oxide (CaO). This composition is preferred since it is the most stable chemically, and provides the optimum reduction of the temperature coefficient of resistance of the resistance material.

The glasses of the present invention were tested for resistance to water attack using the standard A.S.T.M. test for chemical durability of glass. For this test, 10 grams of crushed glass particles of the required size were digested with 100 milliliters of distilled water for 4 hours at 90 ±0.5° C., and the loss in weight of the glass particles caused by water attack was determined. Table I shows the weight loss in percent for the glasses of the present invention and a barium borosilicate glass.

TABLE I

| Glass Composition (percent by weight) | | | | | | Chemical Durability (wt. loss in percent) |
|---|---|---|---|---|---|---|
| BaO | $B_2O_3$ | $SiO_2$ | $TiO_2$ | $Al_2O_3$ | CaO | |
| 60 | 20 | 20 | --- | ----- | --- | 0.65 |
| 49 | 21.5 | 20.5 | 5 | ----- | 4 | 0.30 |
| 52 | 20 | 20 | 4 | 4 | --- | 0.23 |

In addition, the glasses of the present invention of the composition shown in Table I have lower softening temperatures, lower coefficients of thermal expansion, and lower devitrification tendencies than the barium borosilicate glass.

To form a resistance material with the glass of the present invention, the glass as a finely divided frit is mixed with conductive metal particles in an organic vehicle. Although various metals can be used as a conductive metal in the resistance material, the noble metals have been found to be the most satisfactory. Particularly, palladium or a mixture or alloy of palladium and silver has been found to provide resistance materials having very satisfactory resistance characteristics. The organic vehicle may be any liquid or semi-liquid medium in which the glass frit and conductive particles can be uniformly dispersed without chemically attacking the glass frit and conductive particles, and which will evaporate at the temperature at which the resistance material is fired, such as butyl carbitol acetate, or water. The ratio of the amount of the glass frit to the amount of the conductive metal particles varies with the desired resistance value of the resistance material. The higher the content of the conductive metal particles, the lower the resistance value and vice versa. Since the organic vehicle is merely a dispersing agent for the glass frit and the conductive metal particles, the amount of the vehicle used in the resistance material depends on the manner that the resistance material is to be applied to the insulating substrate. For screen stencilling a resistance material on the substrate, a thicker paste-like composition is desirable, whereas for dipping, painting or spraying, a thinner composition is desirable.

The glass of the present invention is made by the well known techniques for making a glass frit. The desired quantities of the batch ingredients are thoroughly mixed together, such as in a ball mill. The batch ingredients may be any compound that will yield the desired oxides under the usual conditions of frit production. For example, barium oxide will be obtained from barium carbonate, boron oxide from boric acid, silicon dioxide from pure silica, titanium oxide from pure titanium dioxide, aluminum oxide from pure alumina or aluminum hydroxide and calcium oxide from calcium carbonate. The mixture of the batch ingredients are fed into a crucible, preferably of fused silica, which is preheated in a furnace maintained at approximately 1,350° C. The mixture is heated in the furnace until it is completely melted, approximately one hour for two kilograms of the mixture. The crucible is then removed from the furnace and the molten glass gently swirled or stirred in a circular motion for a couple of minutes to insure a thorough mixing of the ingredients. The molten glass is then poured in a thin stream into cold water to form the frit. The coarse frit is preferably milled in a ball mill to reduce the particle size of the frit.

To make a resistance material with the glass of the present invention, the desired quantities of the glass frit and the conductive metal particles are broken down, such as by ball milling, to a particle size of preferably one to two microns average size. The glass frit and the conductive metal particles are than thoroughly mixed together in the organic liquid vehicle. The mixture is then adjusted to the proper viscosity for the desired manner of applying the resistance material to a substrate by either adding or removing the liquid medium of the material.

Resistors are made with the resistance material of the present invention by applying a coating of uniform thickness of the resistance material on a substrate of an insulating material which can withstand the firing temperatures of the resistance material. The substrate is preferably a ceramic, such as glass, porcelain, refractory, barium titanate, alumina or the like. The resistance material may be coated on the substrate by brushing, dipping, spraying, or screen stencil application. The substrate with the resistance material coating is then fired in a furnace at a temperature at which the glass frit is molten or below the melting temperature of the conductive particles. When the substrate and the resistance material is cooled, the resistance material hardens to bond the resistance material to the substrate.

The following examples are given to illustrate certain preferred details of the invention, it being understood that the details of the examples are not to be taken as in any way limiting the invention thereto.

*Example I*

A glass frit of the present invention consisting of by weight 52% barium oxide (BaO), 20% boron oxide ($B_2O_3$), 20% silica ($SiO_2$), 4% titanium oxide ($TiO_2$), and 4% aluminum oxide ($Al_2O_3$) was made by the method previously described. Various resistor compositions were prepared by blending together this glass frit with various amounts of a mixture of 56% palladium particles and 44% silver particles. The total conductive metal content of the vairous resistor compositions varied from 30% to 55%. The glass frit and conductive metal mixtures were each blended with a squeegee medium manufactured by L. Reusche and Company, Newark, New Jersey, on a three roll mill.

Each of the resulting compositions was screen stencilled on a plurality of ceramic plates. The ceramic plates were annular having an inner diameter of .286 inch, an outer diameter of .376 inch and a .060 inch wide cut therethrough. The ceramic plates coated with each resistor composition blend were divided into three groups, and fired in a tunnel kiln with a 30 minute cycle. One group was fired at 775° C., the second group at 800° C., and the third group at 825° C. The resistance value and the temperature coefficient of resistance of each of the resulting resistors was measured.

The drawing is a graph of the temperature coefficient of resistance of the resistors plotted against the resistance value of the resistors. The solid lines indicate the temperature coefficient of resistance of the resistors of each group measured between 25° C. and 150° C., and the dash lines indicate the temperature coefficient of resistance measured between 25° C. and —50° C. Each line of the graph is marked with the firing temperature of the resistors indicated by the line. Since the resistance value of the resistor is dependent on the metal content of the resistance composition, the metal content providing the various ranges of resistance values is indicated on the graph. However, it should be understood that the metal contents indicated on the graph do not indicate a specific resistance value, but are merely an indication of a range of resistance values.

*Example II*

Using a glass frit of the same composition and made in the same manner as in Example I, a resistor composition was prepared containing by weight 30% glass frit and 70% of a mixture of tungsten carbide and tungsten with the ratio of tungsten carbide to tungsten being 4 to 1. The glass frit, tungsten carbide and tungsten were thoroughly mixed together in butyl carbitol acetate. The resulting composition was then applied onto the surface of cylindrical ceramic bodies, ⅞ inch long and ¼ inch in diameter in the form of a narrow helical path. The coated ceramics were then fired in a nitrogen-hydrogen atmosphere at 975° C. for ½ hour. The resulting resistors had an average resistance value of 25K ohms, and an average temperature coefficient of resistance of +80 parts per million per ° C. when heated from +25° C. to +150° C. and +170 parts per million per ° C. when cooled from +25° C. to —55° C. Also, when the resistors were tested in a high moisture atmosphere under an electrical load, the change in resistance was very small (+.16%) showing good stability with regard to moisture.

*Example III*

A glass frit of the present invention consisting of by weight 55% barium oxide (BaO), 20% boron oxide ($B_2O_3$), 20% silica ($SiO_2$), 2.5% titanium oxide ($TiO_2$) and 2.5% aluminum oxide ($Al_2O_3$) was made by the method previously described. A resistor composition was prepared by blending together 50% of the glass frit and 50% of a mixture of palladium particles and silver particles. The metal particle mixture consisted of 56% palladium and 44% silver. The glass frit and conductive metal mixture was blended with a squeegee medium as described in Example I. The resulting composition was screen stencilled on ceramic plate as described in Example I, and the coated plates were fired in a tunnel kiln at 800° C. with a 30 minute cyle. The resulting resistors had an average resistance value of 250 ohms and a temperature coefficient of resistance when measured from +25° C. to 150° C. of +310 parts per million per ° C.

Example IV

A glass frit consisting of by weight 50% barium oxide (BaO), 20% boron oxide ($B_2O_3$), 20% silica ($SiO_2$), 5% titanium oxide ($TiO_2$) and 5% aluminum oxide ($Al_2O_3$) was made by the method previously described. Using this glass frit, a resistor composition and resistors were made in the same manner as described in Example III. The resulting resistors had an average resistance value of 10,000 ohms and a temperature coefficient of resistance when measured from $+25°$ C. to $+150°$ C. of $-200$ parts per million per $°$ C.

Example V

A glass frit consisting of by weight 49% barium oxide (BaO), 21.5% boron oxide ($B_2O_3$), 20.5% silica ($SiO_2$), 4% calcium oxide (CaO) and 5% titanium oxide ($TiO_2$) was made by the method previously described. A resistance composition was prepared containing 45% of this glass frit and 55% of the mixture of palladium particles and silver particles used in Example III. Resistors were made with this resistance composition in the manner described in Example III. The resulting resistors had an average resistance value of 120 ohms, and a temperature coefficient of resistance of $+320$ parts per million per $°$ C. when measured from $+25°$ C. to $+150°$ C. and $+250$ parts per million per $°$ C. when measured from $+25°$ C. to $-55°$ C.

The present invention may be embodied in other specific forms without departing from the spirit or essential attributes thereof and, accordingly, reference should be made to the appended claims, rather than to the foregoing specification as indicating the scope of the invention.

I claim:
1. A vitreous enamel resistor composition adapted to be applied to and fired on a ceramic body to form electrical resistors comprising a mixture of finely divided electrically conductive particles selected from the group consisting of metals and tungsten carbide, and a glass frit, said glass frit consisting essentially of by weight 35 to 70% barium oxide, 0.1 to 60% boron oxide, 0.1 to 50% silica, and 0.1 to 10% titanium oxide and an oxide selected from the group consisting of aluminum oxide and calcium oxide.

2. A vitreous enamel resistor composition adapted to be applied to and fired on a ceramic body to form electrical resistors comprising a mixture of finely divided electrically conductive particles selected from the group consisting of metals and tungsten carbide, and a glass frit, said glass frit consisting essentially of by weight 52% barium oxide, 20% boron oxide, 20% silica and 8% titanium oxide and an oxide selected from the group consisting of aluminum oxide and calcium oxide.

3. A vitreous enamel resistor composition adapted to be applied to and fired on a ceramic body to form electrical resistors comprising a mixture of finely divided electrically conductive particles selected from the group consisting of metals and tungsten carbide, and a glass frit, said glass frit consisting essentially of by weight 52% barium oxide, 20% boron oxide, 20% silica, 4% titanium oxide and 4% of an oxide selected from the group consisting of aluminum oxide and calcium oxide.

References Cited by the Examiner

UNITED STATES PATENTS

| | | | |
|---|---|---|---|
| 2,961,563 | 11/1960 | Peras | 252—520 |
| 3,154,503 | 10/1964 | Janakirama-Rao et al. | 252—514 |

FOREIGN PATENTS

| | | |
|---|---|---|
| 714,965 | 9/1954 | Great Britain. |
| 746,566 | 3/1956 | Great Britain. |

LEON D. ROSDOL, *Primary Examiner.*

JULIUS GREENWALD, *Examiner.*

J. D. WELSH, *Assistant Examiner.*